United States Patent [19]

McCullough

[11] Patent Number: 4,512,066

[45] Date of Patent: Apr. 23, 1985

[54] METHOD OF FABRICATING SCROLL MEMBERS

[75] Inventor: John E. McCullough, Carlisle, Mass.

[73] Assignee: Arthur D. Little, Inc., Cambridge, Mass.

[21] Appl. No.: 239,414

[22] Filed: Mar. 2, 1981

[51] Int. Cl.³ .............................................. B23D 15/02
[52] U.S. Cl. .............................. 29/23.5; 29/156.8 R; 409/244
[58] Field of Search ................... 409/59, 60, 244, 259; 29/23.5, 156.4 R, 156.4 WL, 156.8 R, 156.8 CF, 156.8 B, 527.6, 558; 407/12, 13, 14, 16, 19; 418/55

[56] References Cited

U.S. PATENT DOCUMENTS 3,659,324 5/1972 Murray .................................. 29/558
3,692,429 9/1972 Redding .......................... 29/156.8 R

FOREIGN PATENT DOCUMENTS 159712 12/1979 Japan .............................. 29/156.8 R
160194 12/1980 Japan .................................... 418/55

Primary Examiner—William R. Briggs
Assistant Examiner—Thomas M. Kline
Attorney, Agent, or Firm—Richard J. Hammond

[57] ABSTRACT

Method for forming scroll members comprising an end plate having an involute wrap rigidly affixed thereto. The end plate and involute wrap are precision formed, e.g., by casting, either as an integral element or as two separate elements and then the scroll member is broached to the desired dimensional accuracy and finish. Push broaching is accomplished with an involute broaching tool which has a single terminating cutting edge on one or both sides of an involute blade cutter.

10 Claims, 22 Drawing Figures

METHOD OF FABRICATING SCROLL MEMBERS

This invention relates to scroll-type apparatus and more particularly to the construction of the scroll members used therein.

There is known in the art a class of devices generally referred to as "scroll" pumps, compressors and expanders wherein two interfitting spiroidal or involute spiral elements of like pitch are mounted on separate end plates. These spiral elements are angularly and radially offset to contact one another along at least one pair of line contacts such as between spiral curved surfaces. A pair of line contacts will lie approximately upon one radius drawn outwardly from the central region of the scrolls. The fluid volume so formed therefore extends all the way around the central region of the scrolls and comprises one or more fluid pockets, the angular position of which varies with relative orbiting of the spiral centers. All of these pockets maintain the same relative angular position; and as the contact lines shift along the scroll surfaces, the pockets experience a change in volume. The resulting zones of lowest and highest pressures are connected to fluid ports.

Important recent developments in scroll apparatus technology have essentially solved the problems connected with the attainment of effective sealing of the fluid pockets; and a number of novel driving means, coupling means, thrust bearing means, porting means, etc., suitable for scroll apparatus, have been disclosed. (See for example U.S. Pat. Nos. 3,874,827, 3,884,599, 3,924,977, 3,986,799, 3,994,663, 3,994,636, 4,065,279, 4,082,484, 4,121,438, 4,129,409, 4,160,629, 4,192,152 and 4,199,308.)

In constructing the scroll members, each of which comprises an end plate with the involute spiral wrap element attached thereto, it has been the practice to form these members from a single piece of metal by machining out the involute spiral wraps. Although this is, of course, within the capabilities of present milling techniques, it consumes a great deal of time and energy and produces large quantities of waste metal. Thus relying solely on milling techniques for scroll member fabrication makes it unduly expensive to make scroll members for scroll-type apparatus, a fact which for many applications does not permit scroll-type apparatus to compete in price with other types of compressors or expansion engines. Such added cost thus outweighs the operational advantages inherent in scroll-type machinery.

Radial sealing of the fluid pockets, i.e., sealing across the surface of the involute wraps to prevent leakage from a pocket of higher pressure to an adjacent pocket of lower pressure is preferably controlled through the use of axial compliance/sealing means such as detailed in U.S. Pat. Nos. 3,994,636 and 4,199,308 and in U.S. application Ser. No. 233,915, filed Feb. 12, 1981. The use of such sealing means eliminates the need for the lapping of the wrap and end plate contacting surfaces. However, effective sealing requires that along its entire length the involute wrap is joined at its base to the end plate to define a right angle or other suitable configuration to permit the required contact with the opposing end of the complementary scroll member when assembled in an operational scroll apparatus. Effective sealing also requires the accurate dimensioning and finishing of the wrap flanks and the end plate surface.

A suitable mass production technique for scroll components, i.e., scroll members, should involve minimum machining; and it should provide components which meet the stringent requirements for dimensional accuracy and finishing associated with efficient scroll operation. There are two basic constructional alternatives for fabricating scroll members, namely, forming them from an integrally cast involute and end plate or forming the involute and end plate separately and joining them into a finished scroll member.

Precision die casting of a scroll member either as an integral element or as a separate involute wrap and end plate, followed by one or another finishing techniques, eliminates the disadvantages of having to rely solely on milling of the involute wrap. One such finishing technique is coining, or cold forming in a closed die; and it is described in my copending application Ser. No. 239,564, filed concurrently herewith. In U.S. Pat. No. 3,994,365, there is disclosed an alternative to the machining of the wrap flanks and end plate surfaces and to the combined techniques of precision casting and coining. This patent teaches the construction of a two-piece scroll member in which the involute wrap is seated in a channel in the end plate surface in such a manner as to be either free to experience small axial and radial excursions in the channel or to be rigidly attached to the end plate. In my copending application Ser. No. 239,564, filed concurrently herewith, I have described an improved method of rigidly attaching an involute wrap, seated in a channel, to an end plate. This method comprises the steps of forming in the surface of the end plate an involutely configured channel; forming a reentrant groove in one side wall of the channel along its length; providing the involute wrap sized and configured to seat in the channel and having a surface configured to at least partially engage the reentrant groove along its length; seating the wrap into the channel thereby to define a locking space between the flank of the wrap and the other side wall of the channel; and locking the wrap in the channel into fixed engagement with the end plate.

There are, however, instances in which neither precision casting followed by coining nor forming separate elements followed by a joining step is practical. Thus, for example, many cast irons and stainless steels cannot be satisfactorily coined. Moreover, in some instances forming separate wraps and end plates and subsequently assembling them may require excessive labor costs, particularly in those situations wherein the volume of scroll member production is such as to justify the cost of relatively expensive tooling. It would therefore be desirable to have available a method of fabricating scroll members as an integral element with minimum expenditure of labor and of forming them from metals not readily coined or cold formed.

It is therefore a primary object of this invention to provide an improved method of fabricating scroll members from a preformed integral element. It is another object to provide a method of the character described which is particularly suited to forming scroll members of less ductile metals. Yet another object is to provide a method of forming scroll members adaptable to high-volume production wherein tooling costs can be offset by decreased labor costs.

It is another primary object of this invention to provide novel tooling for forming scroll members. A further object is to provide tooling of the character described which achieves the dimensional accuracy and finishing of the flanks of the involute wrap through broaching.

Other objects of the invention will in part be obvious and will in part be apparent hereinafter.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

According to one aspect of this invention there is provided a method of fabricating a scroll member, comprising the steps of providing a precision preformed scroll member as an element having affixed to an end plate an involute wrap having its inner and outer flanks joined to the end plate along the base of the involute wrap; forming reentrant corners between the surface of the end plate and the inner and outer flank surfaces joining the involute wrap to the end plate; broaching the inner and outer flanks of the involute wrap axially toward the surface of the end plate to attain a predetermined thickness of said involute wrap and a radial spacing between the turns thereof, the reentrant corners providing clearance for chips resulting from the broaching. The inner and outer flanks may be broached separately or simultaneously. When the flanks are separately broached either the broach or scroll member is angularly indexed relatively to the other, thus providing sequential engagement of the cutting edge with the flank until the desired dimensions and finish are attained. When the flanks are broached simultaneously, a series of broaches are used.

According to another aspect of this invention there is provided a broaching tool for fabricating a scroll member formed as an involute wrap rigidly affixed to an end plate, comprising an involute blade cutter terminating in a tooth running along essentially the full length of at least one side of the blade carrier, the tooth having a cutting edge with the same involute contour and pitch of the finally broached involute wrap or the scroll member.

According to yet another aspect of this invention there is provided a broaching machine for fabricating a scroll member formed as an involute wrap rigidly affixed to an end plate, comprising in combination a broaching tool comprising an involute blade cutter terminating in a tooth running along essentially the full length of at least one side of the blade cutter, the tooth having a cutting edge with the same involute contour and pitch of the finally broached involute wrap of the scroll member; broaching tool support means; workpiece support means arranged to support the scroll member in a predetermined position relative to the broaching tool; force applying means for effecting relative vertical motion between the broaching tool support means and the workpiece support means along the axis of the scroll member whereby the cutting edge engages and broaches the flank of the wrap.

For a fuller understanding of the nature and objects of the invention, reference should be had to the following detailed description taken in connection with the accompanying drawings in which FIG. 1 is a top planar view of a typical scroll member;

Figure 8:
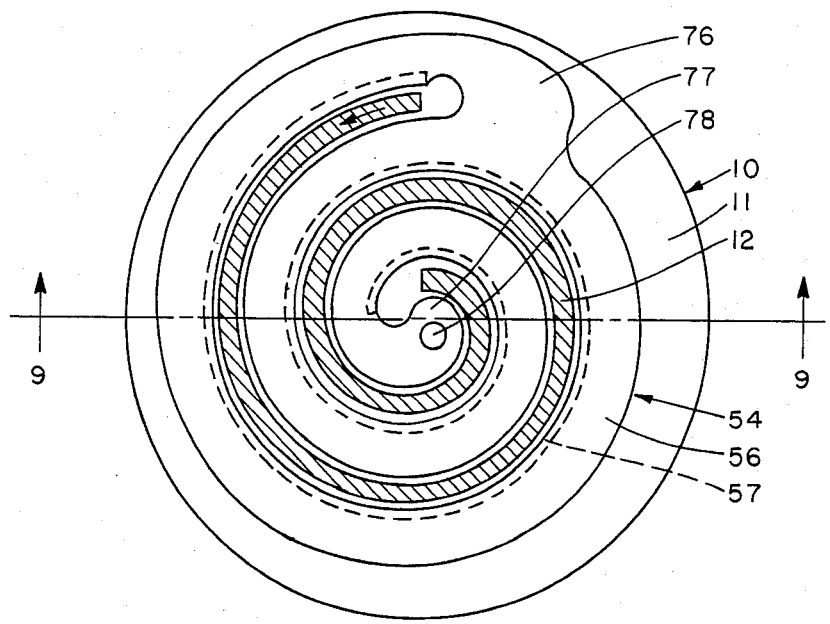
Figure 9:
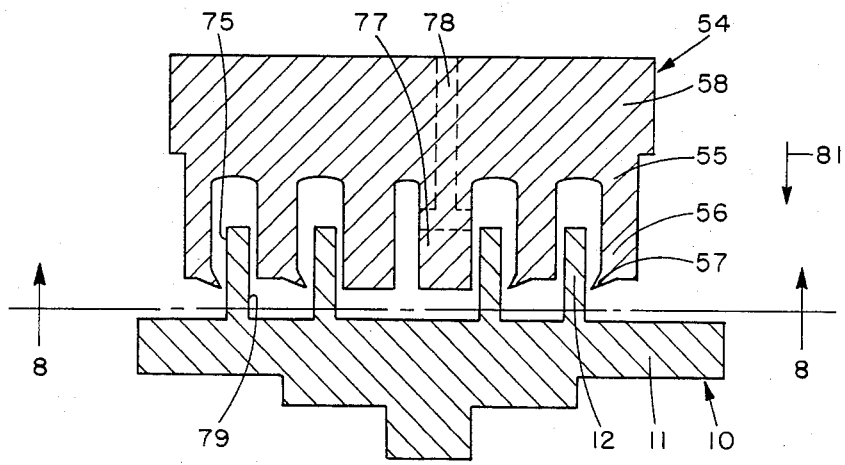
Figure 10:
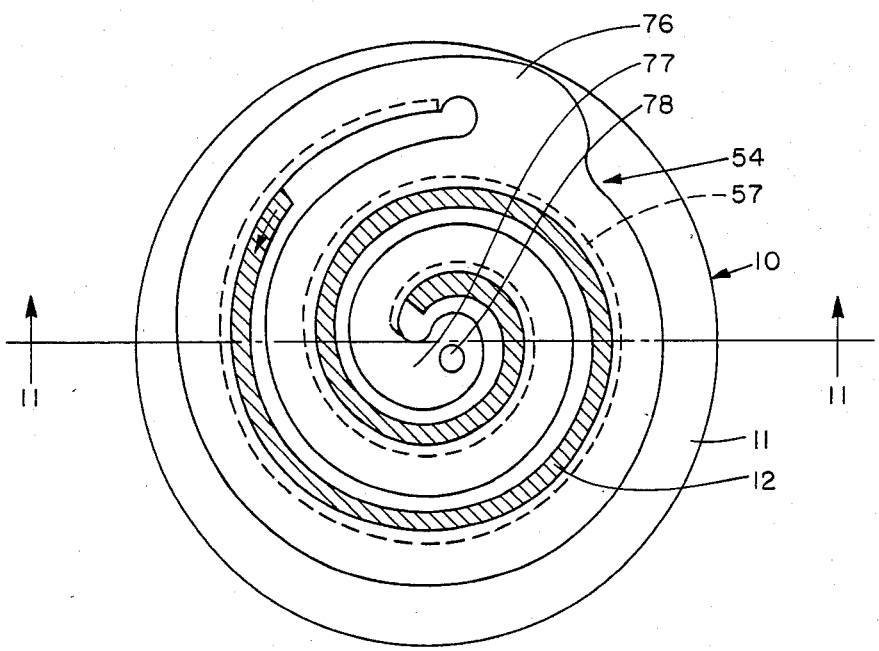
Figure 11:
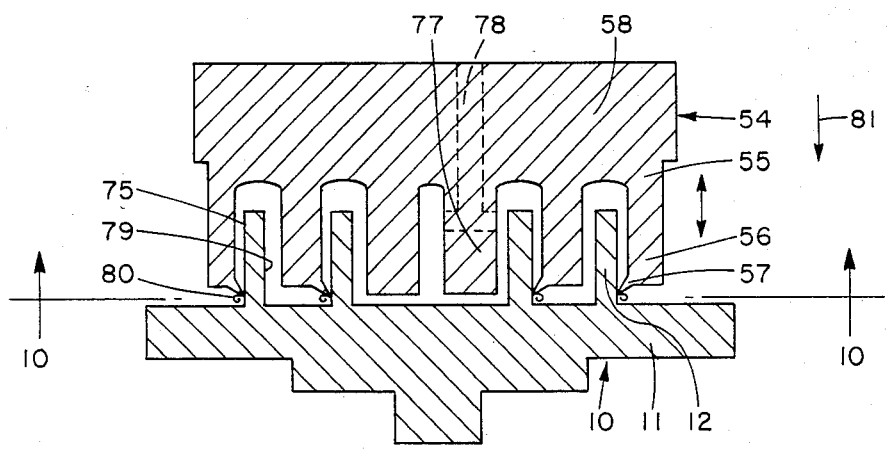
Figure 12:
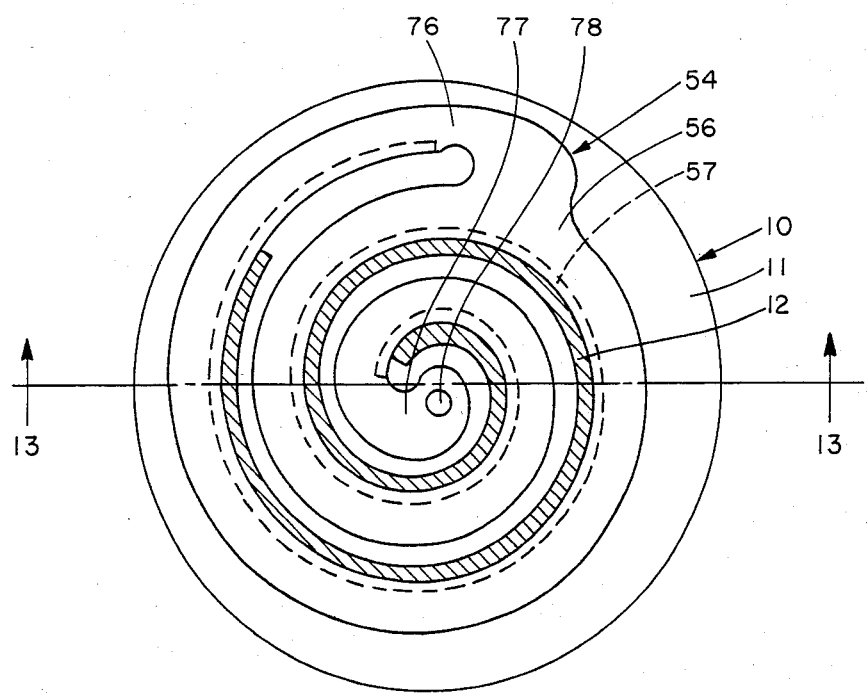
Figure 13:
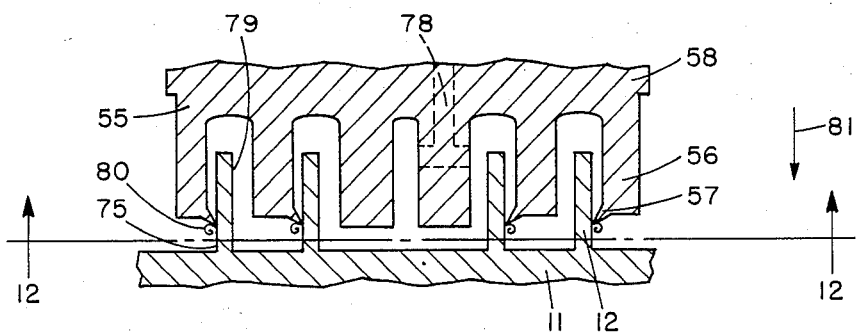
Figure 14:
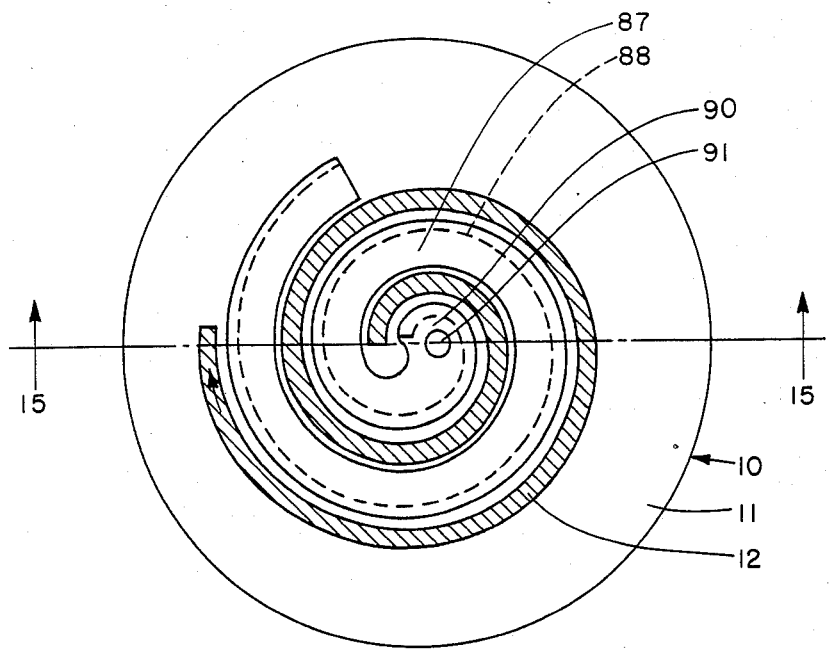
Figure 15:
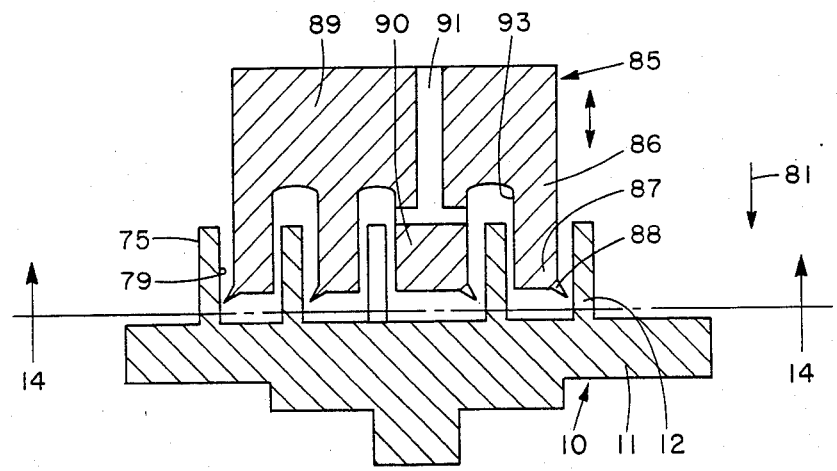
Figure 16:
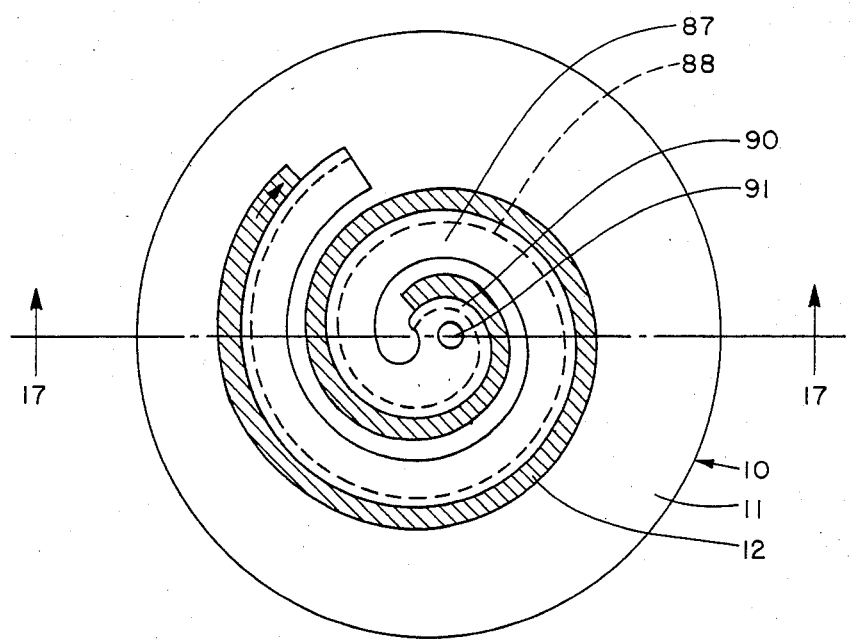
Figure 17:
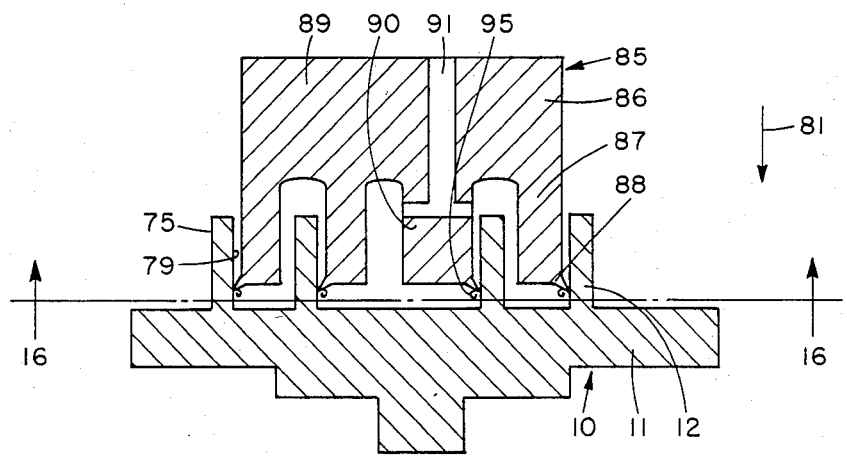
Figure 18:
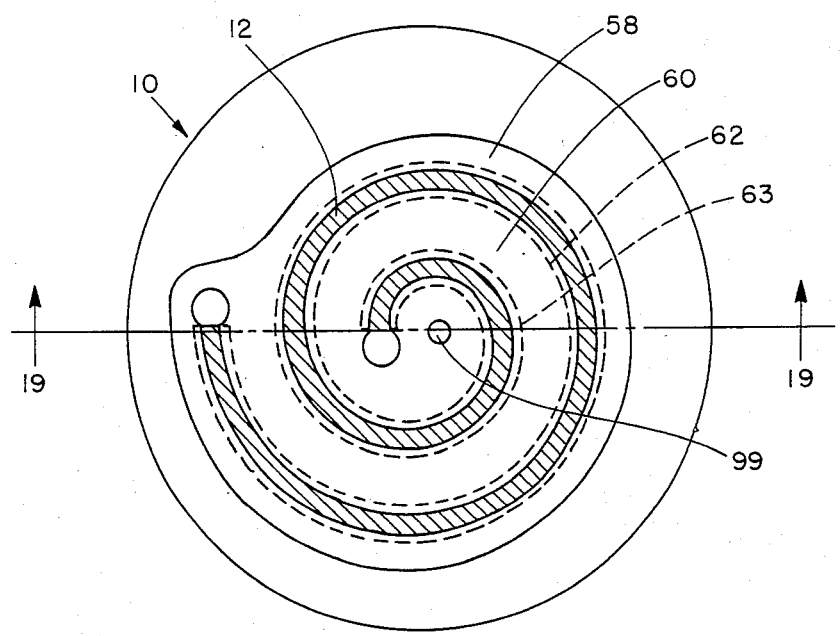
Figure 19:
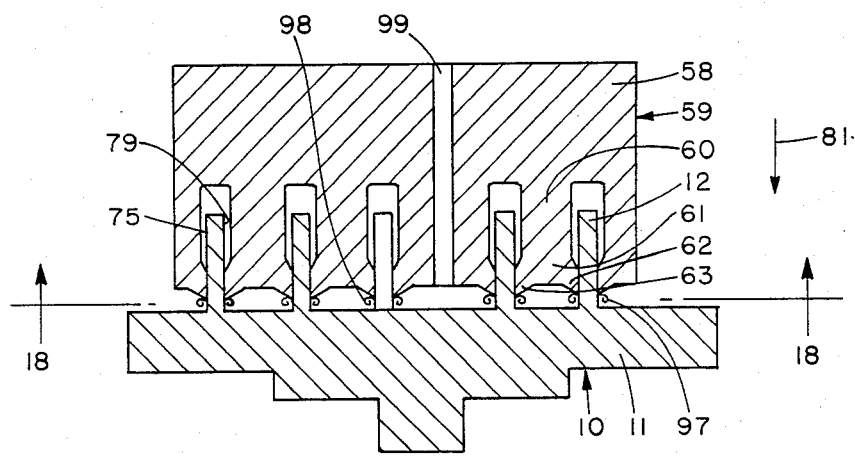
Figure 20:
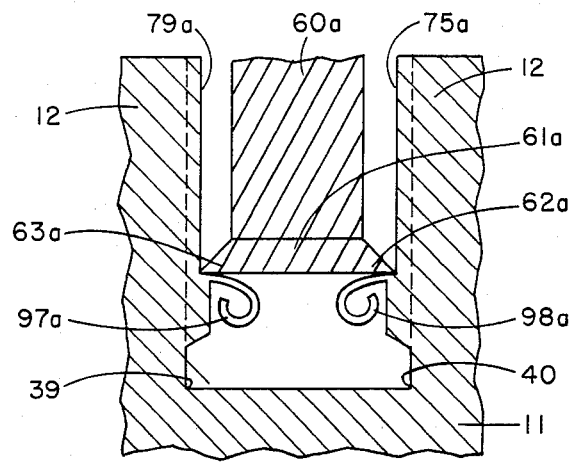
Figure 21:
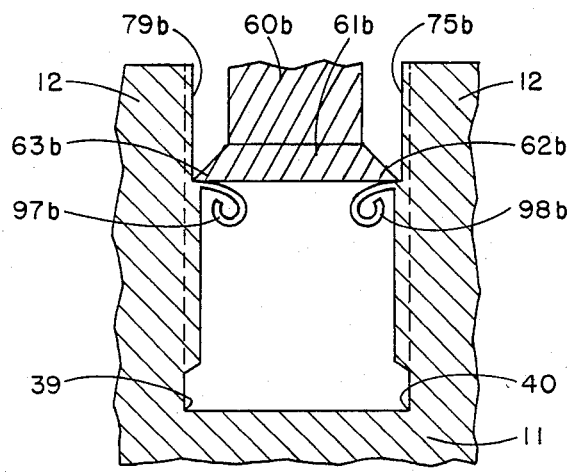
Figure 22:
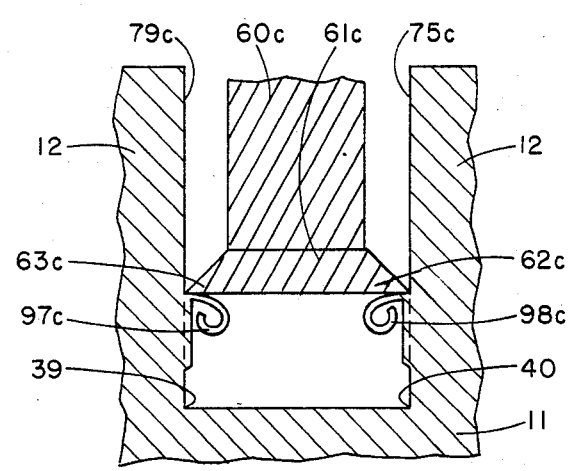

FIGS. 8 and 9 illustrate in cross sections the positioning of the scroll member in the broach preparatory to the beginning of the broaching of the outer flank of an involute wrap according to the method of this invention using a single sided broach, FIG. 8 being taken through plane 8—8 of FIG. 9 and FIG. 9 through plane 9—9 of FIG. 8;

FIGS. 10 and 11 illustrate in cross sections the beginning of the broaching of the outer flank of the involute wrap, FIG. 10 being taken through plane 10—10 of FIG. 11 and FIG. 11 through plane 11—11 of FIG. 10;

FIGS. 12 and 13 illustrate in cross sections the completing of the broaching of the outer flank of the involute wrap, FIG. 12 being taken through plane 12—12 of FIG. 13 and FIG. 13 through plane 13—13 of FIG. 12;

FIGS. 14 and 15 illustrate in cross sections the positioning of the scroll member in the broach preparatory to the beginning of the broaching of the inner flank of an involute wrap according to the method of this invention, using a single-sided broach, FIG. 14 being taken through plane 14—14 of FIG. 15 and FIG. 15 through plane 15—15 of FIG. 14;

FIGS. 16 and 17 illustrate in cross sections the beginning of the broaching of the inner flank of the involute wrap, FIG. 16 being taken through plane 16—16 of FIG. 17 and FIG. 17 through plane 17—17 of FIG. 16;

FIGS. 18 and 19 illustrate in cross sections the simultaneous broaching of the inner and outer flanks of the involute wrap according to the method of this invention using a double-sided broach, FIG. 18 being taken through plane 18—18 of FIG. 19 and FIG. 19 through plane 19—19 of FIG. 18;

FIGS. 20—22 illustrate in fragmentary cross section the use of a set of double-sided broaches used in sequence to obtained desired dimensions and finish.

Figure 1:
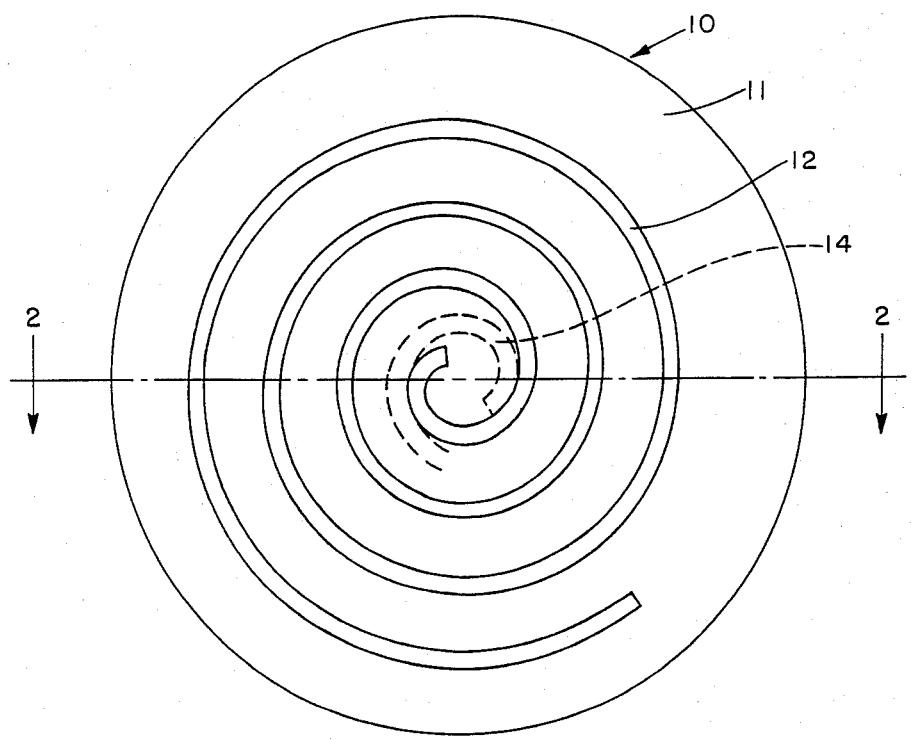
Figure 2:
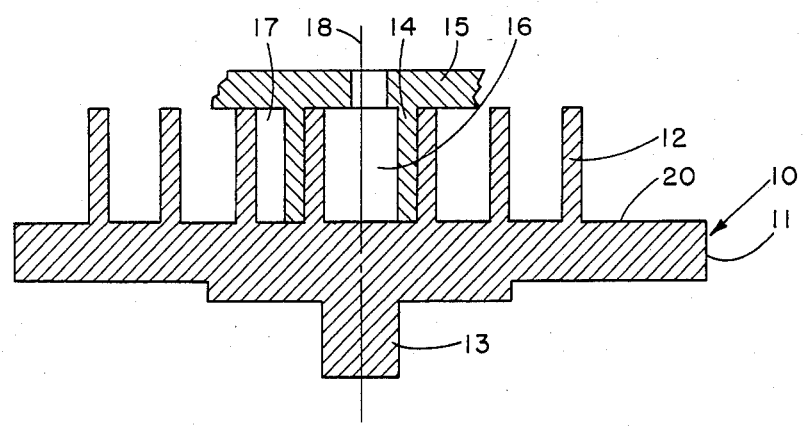
FIG. 2 is a cross section of the scroll member of FIG. 1 through plane 2—2 of FIG. 1 along with a fragmentary cross section of a complementary mating scroll member.

FIGS. 1 and 2 illustrate the basic design of a typical scroll member suitable for use in any of the scroll apparatus described in the previously listed U.S. Patents. The basic construction of any scroll member 10 comprises an end plate 11 and an involute wrap 12 affixed thereto. The wrap is hereinafter for convenience referred to as being "involute", i.e., configured as an involute of a circle. However, it is to be understood that the wraps may have, for example, the configuration of an arc of a circle or any other suitable shape. The scroll member 10 of FIGS. 1 and 2 is suitable as the orbiting member of a scroll apparatus and is therefore shown to have a stub shaft 13. It will be appreciated that requirements for such other features as keyways, ports, peripheral walls, special bearing surfaces and the like may vary from one scroll apparatus to another and that the various configurations and/or surface modifications required to provide such features may be provided through the use of well-known fabrication techniques.

As detailed in the U.S. Patents previously listed, a scroll apparatus is made up of complentary scroll members having facing end plates with angularly and radially offset involute wraps of like pitch. The orbiting of one of these scroll members angularly and radially offset from the other defines fluid pockets which in the case of a compressor or expander decrease in pressure radially outward from the machine axis. Thus as illustrated in partial cross section in FIG. 2, the contacting of wrap flanks 14, affixed to the complementary end plate 15 of a stationary scroll member defines fluid pockets 16 and 17 in which $P_{16} > P_{17}$.

The dimensional accuracy and precision of finishing which must be attained in the manufacture of highly efficient scroll members may be illustrated using as exemplary one having involute wraps which are 0.187 inch (0.475 cm) thick and 1.25 inches (3.175 cms) high. The distances from the centerline 18 to the inner and outer wrap flank surfaces should be within 0.001 inch (0.025 mm).

The broaching of the flanks or side walls of the involute wrap presents a situation with unique characteristics giving rise to the need for solving several unique problems. First, it is only possible to broach axially toward the end plate surface 20 (FIG. 2), a fact which means that the broach is being directed into a blind corner which leaves no provision for a clearance space for the chip formed. Moreover, since the geometry of the scroll member prohibits the use of a long broach, it is necessary to use a relatively short one which is limited to one tooth. Finally, the depth of cut of the single tooth must be precisely controlled. As will be seen from the following detailed description of the invention, solutions of these problems are to be found in the method and apparatus of this invention.

FIG. 3 illustrates the formation of an adequate chip clearance space and the finishing of the end plate surface preparatory to the broaching of the inner and outer flank walls of the involute wrap. It should be noted that FIG. 3, as well as FIG. 4 described below, it not drawn to scale and that some dimensions are highly exaggerated for purposes of illustration.

Figures 3A, 3B, 3C:
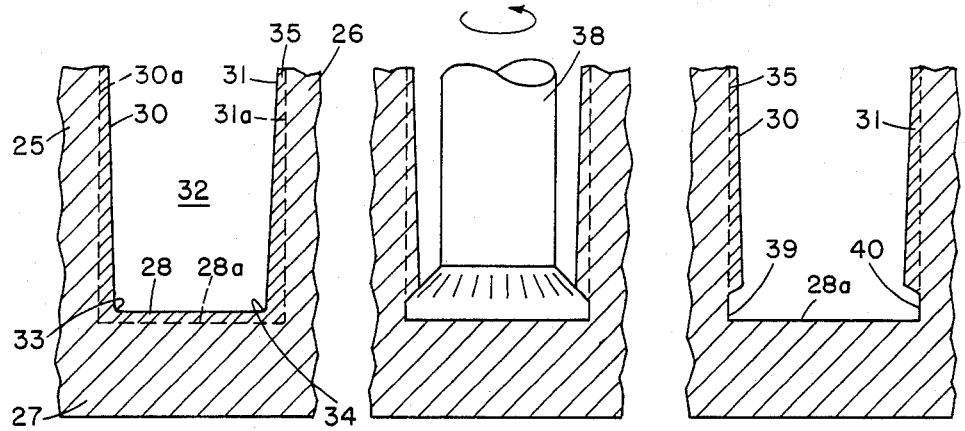
FIG. 3 illustrates in cross section the milling of the end plate surface and the forming of a reentrant corner between the surface and the flanks of the wraps preparatory to the axial broaching of the flanks.

Turning first to FIG. 3A, there is shown in that drawing a fragmentary cross section of two adjacent turns 25 and 26 of an involute wrap integral with an end plate 27 having a contacting surface 28. Assuming that the centerline of the scroll member lies to the right of FIG. 3A, involute turn 25 will be seen to have an inner flank wall 30 and involute turn 26 on outer flank wall 31. Between walls 30 and 31 is working space 32 into which is fit the involute wrap of the complementary mating scroll member as illustrated in FIG. 2. For purposes of this illustration, walls 30 and 31 are shown to be formed with inward flares and to have fillets with end plate surface 28 which represent dead corners 33 and 34. Since in its preferred configuration the scroll member has an involute with flank walls which are perpendicular to the end plate surface the desired final configuration for the flanks is shown by the dotted lines 28a, 30a and 31a. This then means that the meteral 35 defined between the actual precision preform (e.g., cast) form defined by walls 28, 30 and 31 and the final required form defined by walls 28a, 30a and 31a, must be removed.

In order to overcome the problem arising from blind corners 33 and 34 and to attain the desired dimension and finish of the end plate surface, a milling cutter 38 (FIG. 3B) is used to cut reentrant corners 39 and 40 (FIG. 3C) along the involute flank walls 30 and 31 and to finish end plate surface 28a. The milling is, of course, begun at the outboard end of the involute wrap 12 (FIG. 1) and finished at the inboard end. If desired, machining of the tip or contact surface of the involute wrap to a desired dimension and finish may be performed simultaneously with the milling of reentrant corners 39 and 40. The width of the cut of milling cutter 38 is preferably equal to the finished spacing desired between flanks walls 30a and 31a. However, this width may be slightly greater than the desired spacing and hence it can be said that the reentrant corners essentially represent the predetermined finished dimensions of the wrap thickness and radial spacing between the involute turns. As will be shown in connection with FIG. 4, these reentrant corners 39 and 40 provide the necessary clearance for the chips resulting from the broaching.

Figures 4A, 4B, 4C, 4D:
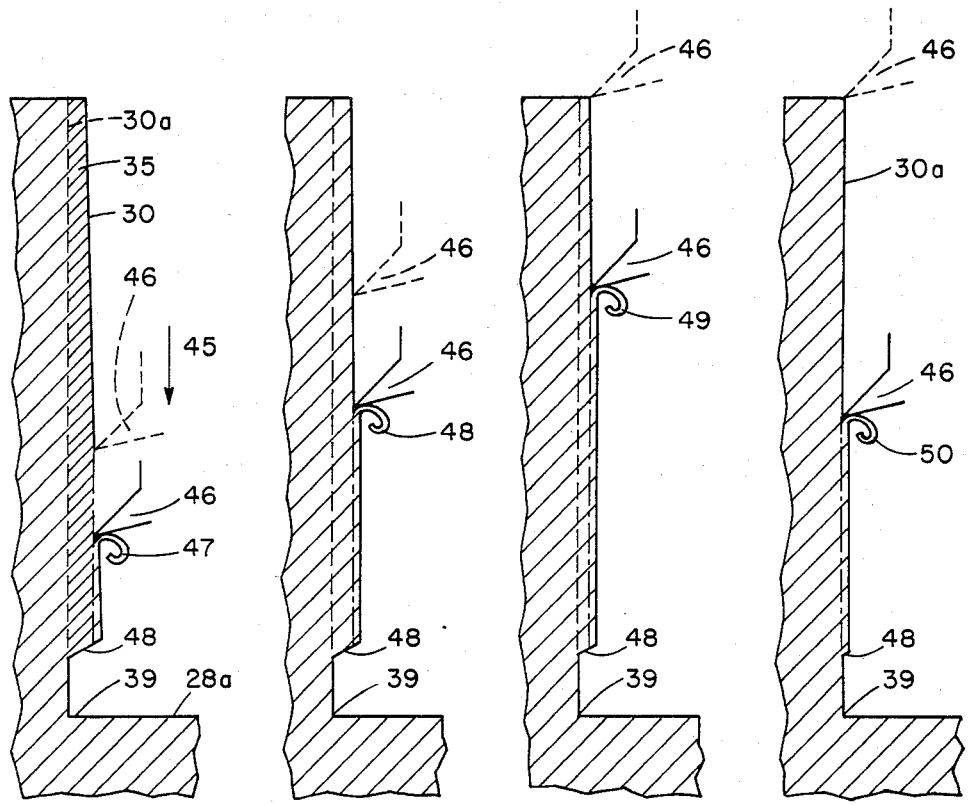
FIG. 4 illustrates the progressive broaching of the flank surfaces and the use of the reentrant corner as a clearance space for the broaching chip.

Before describing the broaching tools of this invention, it will be helpful to show the general function of these tools as they are applied to the unique problem of fabricating scroll members. This may be done with reference to FIG. 4 which shows the progressive broaching of a flank surface, e.g., wall 30 to attain wall 30a. The broach is so arranged as described below, so that in the first axially downward stroke, indicated by arrow 45, the tooth 46 of the broach contacts the wall as indicated by the dotted line position (FIG. 4A). As the broach is forced toward end plate surface 28a it cuts a chip 47 which is broken off at the wall 48 of reentrant corner 39. As shown in FIGS. 4B, 4C and 4D, repetition of the axial stroking of the broach as it is advanced toward the flank wall 30, produces successive chips 48, 49 and 50 until the desired flank wall dimension is attained. As pointed out above, the drawings of FIG. 4 are highly exaggerated and it will be appreciated that the broach tooth may first strike the flank wall anywhere along its height depending upon the configuration of the preformed scroll member being fabricated.

Figure 5:
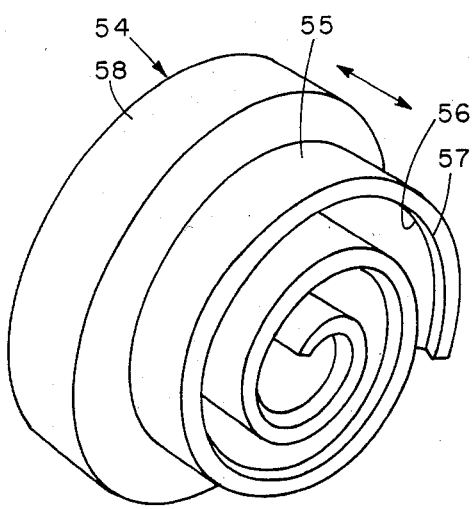
FIGS. 5 and 6 are perspective views of single and double-sided broaches, respectively, constructed in accordance with this invention.
Figure 6:
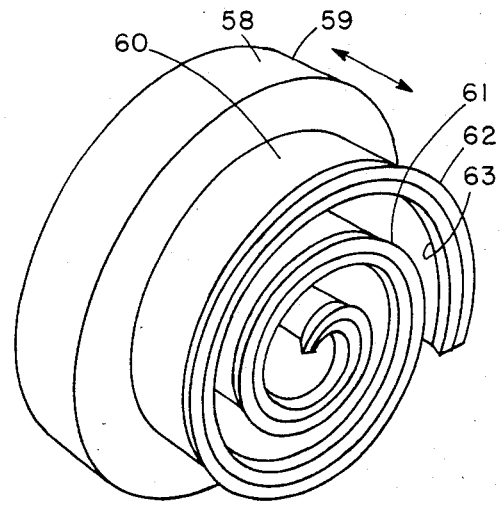

Because of the unique involute configuration of the surface to be broached, it is possible to use either a single-sided or double-sided broaching tool as illustrated in perspective views in FIGS. 5 and 6. The single-sided broach 54 of FIG. 5 comprises an involute support 55 which terminates in a blade cutter 56 with a single cutting edge, i.e., tooth 57. Involute support 55 extends from a subpress member 58. The single-sided broaching tool of FIG. 5, having tooth 57 around the inner side of blade cutter 56, is designed to broach the outer flank wall of an involute wrap. In similar manner, a single-sided broaching tool may be made having a cutting edge, i.e., tooth around the outer side for broaching the inner flank wall. In either of these broaching tool embodiments, the cutting edge has the same involute contour and involute pitch as that required of the finally broached wrap of the scroll member. The term "involute pitch" is defined herein as the numerical difference in the radii of consecutive turns of the outer (or inner) wrap flank walls. These radii are lines drawn tangent to the generating radius. The operations of both of these embodiments of single-sided broaches are described below in conjunction with FIGS. 8-17.

The double-sided broaching tool 59 of FIG. 6 comprises an involute support 60 which terminates in a blade cutter 61 having teeth 62 and 63 with cutting edges disposed on opposite sides of the cutter. Like the single-side tool of FIG. 5, the double-sided tool of FIG. 6 extends from a subpress member 58. The opposed cutting edges of the double-sided broach also have the same involute contour and pitch as that required of the finally broached wrap. The operation of this embodiment of the broaching tool is described below in conjunction with FIGS. 18–22.

The broaching tools, in keeping with well known tool fabrication practice, may be formed of such material as hardened tool steel by any suitable technique.

Figure 7:
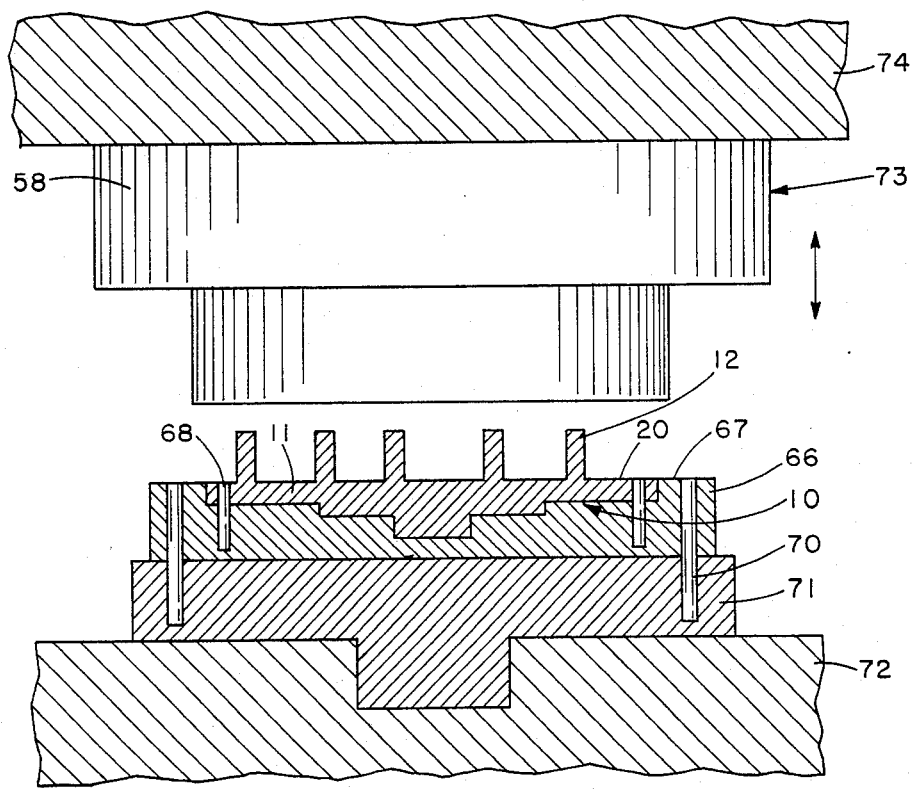
FIG. 7 illustrates in cross section an exemplary broaching machine incorporating the broach of this invention.

The tools of this invention achieve push broaching and they are mounted on machines of the press type as shown in FIG. 7 which illustrates, partially in cross section, a machine for using the tool of FIG. 5. The preformed scroll member 10, such as that of FIGS. 1 and 2, is set in a subpress member 66 configured to seat scroll member 10 so that end plate surface 20 is flush with surface 67. Scroll member 10 is located and held in workpiece subpress 66 by means of several positioning pins 68. As will be detailed below with reference to FIGS. 8–17, it is necessary to be able to move either the scroll member of the broaching tool relative to the other, and this is accomplished in the machine of FIG. 7 by rotating scroll member 10 around its axis. Therefore, subpress 66 is mounted, through aligning pins 70, to an indexing table 71 which is arranged to be rotated with respect to press member 72. As will be made apparent in the discussion of FIGS. 18–22, the double-sided broach and scroll member need not be moved relative to each other so the indexing table 71 may be eliminated in using the broaching tool of FIG. 6, in which case the scroll member subpress 66 is positioned and held directly to press member 72. The tool subpress 58 associated with the broaching tool, shown-generally at 73 in FIG. 7, is affixed by appropriate means (not shown) to press member 74. In accordance with known practice, one of the press members is driven vertically, as indicated by the arrow, by hydraulical means, by screw, rack, crank or the like.

FIGS. 8–13 are presented to illustrate the operation of the single-sided broach of FIG. 5 in broaching the outer flank wall 75 of scroll member 10 constructed as shown in FIGS. 1 and 2. The same reference numbers are used to identify the same elements in FIGS. 1, 2, 5 and 8–13. It will be seen from FIG. 8 that broach 54 preferably has an enlarged outer section 75 and enlarged inner section 77 to impart strength and rigidity to it. Through inner section 77 is drilled a fluid passage 78 for introducing a cutting fluid to carry away the chips formed. It will be appreciated that the drawings in FIGS. 8–17, for purposes of simplicity of illustration, do not detail the reentrant corners shown in FIGS. 3 and 4 or any variations in involute thickness. Rather, these drawings illustrate the indexing of the scroll member relative to the broach and the manner in which the broach achieves the final desired configuration of the scroll member.

As shown in FIGS. 8 and 9, broaching is begun by rotating the indexing table (FIG. 7) so that the outer flank 75 of involute 12 clears the tooth 57 and inner flank 79 clears the outer surface 76 of broach involute 55. Angular indexing the scroll member 10 in a counterclockwise direction then brings the tooth 57 into contact with involute flank 75 somewhere along its height as shown in FIGS. 10 and 11. (See also FIG. 4). Vertically stroking the broach several times in this initially indexed position of the scroll member develops a chip 80 as previously described. The unidirectional broaching is indicated by arrow 81. Scroll member 10 is then further indexed in a counterclockwise direction through a predetermined angle and the vertical stroking is repeated until the desired configuration of the outer involute flank 75 is attained as shown in FIGS. 12 and 13. As will be evident from FIGS. 8–13, rotation of the scroll member, or alternatively of the broaching tool in the opposite direction, winds them together forcing the cutting edge of the broach tooth to continually make contact with the flank being broached. When broaching is complete, rotation of the indexing table, or the tool, in the direction opposite to that used in broaching returns the scroll member, relative to the broach, to a position where it may be removed from the subpress 66 (FIG. 7).

FIGS. 14–17 illustrate the manner in which inner flank 79 of involute wrap 12 is broached with a broaching tool 85 comprising an involute support 86, a blade cutter 87 and outwardly directed tooth 88, all of which are integral with or affixed to a subpress member 89. The enlarged inner section 90 has a fluid passage 91 for introducing a cutting liquid to remove chips. As in the use of the broach of FIGS. 8–13, broaching with tool 85 is begun by indexing scroll member 10 (or alternatively tool 85) so that tooth 88 clears the surface of inner flank 79 and the opposing involute surface 93 of involute support 86 clears outer flank 75 of involute wrap 12. If the scroll member is indexed with relation to the broaching tool, then it is turned in a clockwise direction and it is wound until contact is made between tooth 88 and flank surface 79. After each step of indexing through a predetermined angle, the broach is vertically stroked to form chip 95, and this is continued until the final configuration for flank surface 79 is attained (FIGS. 16 and 17). Again as in finishing the outer flank, the broach is removed after rotating the scroll member in a counterclockwise direction.

In using the single-sided broaching method of this invention, the indexing angle between strokings is used to control the depth of the cut made. The optimum depth of cut will in turn depend upon the material from which the involute wrap is formed, the softer the material the greater the depth of cut per stroke and the greater the indexing angle can be. It is, of course, well within the skill of the art to make such determinations for the fabrication of any one particular scroll member. As the broaching tool wears and dulls, it may, of course, be resharpened. Its subsequent use requires only the resetting of the initial angular position to account for its slight change in size and this is readily done by angular indexing.

The use of the single-sided broaching tools can in some cases give rise to finished scroll members with less than the desired finished dimensions due to the potentially large lateral force exerted on the broach and workpiece during broaching on that part which has an eccentric contour to the preformed involute surface. This problem can be most apparent in the outer regions of the involute where the curvature and lateral stiffness are minimum. Such deflections can be minimized by proper choice of indexing angle and by using single-sided broaching for the stiffer scroll member materials and for the thicker involute wraps.

However, in some cases it will be desirable to use a double-sided broach capable of cutting both sides of the involute simultaneously and thereby minimizing lateral forces on the broach and the workpiece. Such a broach is illustrated in FIGS. 6, 18 and 19. As shown in FIGS. 18 and 19, the broach 59 is sized and configured so that when aligned for broaching, the opposed teeth 62 and 63 can make initial contact with the preformed flank surfaces 79 and 75, respectively. It will, of course, be appreciated that such contact with teeth 62 and 63 will not necessarily at first be made at the same level along the entire length of involute wrap 12, or that it will be made at all along some sections of the entire length. Vertically stroking broaching tool 59 gives rise to chips 97 and 98 which are carried away by cutting oil introduced through liquid passage 99.

The use of a double-sided broaching tool necessitates the employment of a set of broaches used in sequence, each broach being sized with regard to the spacing of opposed teeth 62 and 63 to accommodate the increased spacing between the involute flanks as a result of the preceding broaching. Thus, the broaches in sequence may be used to effect a rough cut, then an intermediate cut and finally a finish cut. A set of such broaches is, of course, not limited to three. Preferably, the amount of material removed in each of these cuts is progressively decreased so that the finish cut is used primarily to accomplish final sizing and finishing of the scroll member.

FIGS. 20-22 illustrate in exaggerated, fragmentary cross sections the use of three such broaches in sequence. In these drawings, the centerline of the scroll member being broached lies to the right of the figures and the reference numerals, where appropriate, are followed by "a", "b" or "c" to designate the rough, intermediate and finish cuts, respectively. It will be seen that by incrementally increasing the distance between opposing teeth 62 and 63 the desired finish and dimensions can be attained (FIG. 22).

When the cutting edges of the broach teeth are sharpened the radial distance between involute turns decreases. Stated another way, the thickness of the involute wrap increases. However, the relief angles on the broach cutting surfaces are small enough so that a given broach can be sharpened many times before the deviation in radial distance or involute thickness is of sufficient magnitude to require changing the broach. However, as the broach becomes increasingly smaller due to sharpening, it can be progressively used for the cuts immediately preceding that for which it had been used, thus maximizing tool life. Moreover, a slight but uniform variation in dimension throughout the scroll member is permissible. The slight dimensional variations in the broaching tool brought about through sharpening as well as the shifting of the tool from cut to cut in a sequence may make it desirable to mount the scroll member to be broached on an indexing table (FIG. 7) so that minor adjustment of the workpiece relative to the broach may be readily made. However, the scroll member in this axial (vertical) broaching is not angularly indexed so long as the same broaching tool is being used.

The broaching method and tools of this invention are applied to fabricating scroll members to predetermined dimensions and finish beginning with precision preformed parts. The precision preforming may be accomplished using such well-known techniques as precision casting (die or lost wax casting), casting followed by cold forging, impact forming and the like. Although the scroll member to be broached must have the involute wrap rigidly and permanently affixed to the end plate, it may be formed originally as separate elements which are then joined by any suitable method such as, for example, those described in my U.S. Pat. No. 3,994,635 and my copending applications Ser. Nos. 239,563 and 239,564. The broaching method is preferably used for removing about 0.005 to about 0.020 inch (about 0.125 to about 0.5 mm) of material from the involute flanks and it may be applied to scroll members formed of aluminum, steel or cast iron, for example. Broaching is capable of reducing the involute surface machining costs associated with fabricating scroll members and facilitates mass production of these components without sacrificing dimensional accuracy or surface finish requirements.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

I claim:

1. A method of fabricating a scroll member comprising the steps of
    (a) providing a precision preformed scroll member as an element having affixed to an end plate an involute wrap having its inner and outer flanks joined to said end plate along the base of said involute wrap;
    (b) forming reentrant corners between the surface of said end plate and said inner and outer flank surfaces joining said involute wrap to said end plate;
    (c) broaching said inner and outer flanks of said involute wrap axially toward the surface of said end plate to attain a predetermined thickness of said involute wrap and a radial spacing between the turns thereof, said reentrant corners providing clearance for chips resulting from said broaching.

2. A method in accordance with claim 1 wherein said step of providing said precision preformed scroll member comprises die casting said scroll member as an integral element.

3. A method in accordance with claim 1 wherein said step of providing said precision preformed scroll member comprises forming said end plate and said involute wrap separately and assembling them into said element.

4. A method in accordance with claim 1 wherein said step of forming said reentrant corners comprises milling said end plate surface to a predetermined finish.

5. A method in accordance with claim 1 wherein said broaching is done with an involutely configured broaching tool with a single terminating cutting edge having the same involute contour and pitch as the finally fabricated scroll member.

6. A method in accordance with claim 5 wherein said inner and outer flanks of said involute wrap are separately broached.

7. A method in accordance with claim 6 wherein said broaching includes effecting relative angular motion between said broaching tool and said scroll member.

8. A method in accordance with claim 7 wherein said step of effecting relative angular motion comprises angularly indexing said scroll member.

9. A method in accordance with claim 1 wherein said broaching is done with an involutely configured broaching tool with opposed terminating cutting edges for simultaneously broaching both flanks of said involute wrap.

10. A method in accordance with claim 9 wherein a series of said broaching tools is used, each of which is sized with regard to the spacing of said opposed cutting edges to accommodate the increased spacing between said involute flanks as a result of the preceding broaching.

* * * * *